United States Patent

Wetzel et al.

[11] 3,832,398
[45] Aug. 27, 1974

[54] D-5-HYDROXY-5-PHENYLLEVULINIC ACID AND SALTS THEREOF

[75] Inventors: Eugene Raymond Wetzel, Spring Valley; Donald Bruce Borders, Suffern, both of N.Y.

[73] Assignee: American Cyanamid Company, Stamford, Conn.

[22] Filed: Mar. 29, 1971

[21] Appl. No.: 129,224

[52] U.S. Cl................. 260/521 R, 195/80, 424/317
[51] Int. Cl............................................. C07c 65/20
[58] Field of Search.................... 260/521 R, 473 A

[56] References Cited
OTHER PUBLICATIONS

Sugiyama et al. C.A. 68 49249f (1968).
Hembest et al. J. Chem. Soc. pp. 3628–3633 (1950).
Reid et al. J. Am. Chem. Soc. 73 1054 (1951).
Seperic, C. A. 66 28791v (1967).
Gandini, C. A. 44 9006g (1950).

Primary Examiner—Lorraine A. Weinberger
Assistant Examiner—John F. Terapane
Attorney, Agent, or Firm—Jack W. Richards

[57] ABSTRACT

The new compound of the formula:

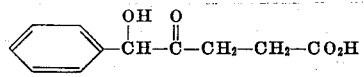

is prepared by the cultivation under controlled aerobic conditions of Tubercularia strain Z1497. Said compound exhibits marked analgesic properties when administered to mammals.

1 Claim, No Drawings

D-5-HYDROXY-5-PHENYLLEVULINIC ACID AND SALTS THEREOF

BRIEF SUMMARY OF THE INVENTION

This invention relates to a new chemical compound, d-5-hydroxy-5-phenyllevulinic acid having analgesic properties; and to a fermentative method for preparing said compound.

DETAILED DESCRIPTION OF THE INVENTION

Numerous analgesic compounds are known. However the compounds that are generally considered to be the more potent analgesics have been found to be addicting when used over extended periods of time. The non-addicting analgesics, such as aspirin, are considered to be of a low order of activity. In view of this, there is a current need for potent non-addicting analgesics. Compounds to be tested for analgesic activity have been obtained by numerous methods, the predominent one being that of total organic synthesis. This invention discloses a method fermentation, a technique more frequency associated with antibiotics in the pharmaceutical industry, to obtain a new compound which exhibits analgesic properties.

The novel compound is formed during cultivation under controlled conditions of a strain of Tubercularia designated Z1497 and deposited at the Quartermaster Research and Development Center, U.S. Army, Natick, Massachusetts. This strain is freely available to the public in this repository under its Accession number QM848. The germs Tubercularia is described in Barnett, 2nd Ed. (1960) "Illustrated Genera of Imperfect Fungi" and Gilman, "A Manual of Soil Fungi" 2nd Ed. (1957).

THE FERMENTATION PROCESS

Cultivation of the organism Tubercularia Z1497 may be carried out in a wide variety of liquid media. Media which are useful for the production of d-5-hydroxy-5phenyllevulinic acid include an assimilable source of carbohydrates such as starch, sugar, molasses, glycerol, etc; and assimilable source of nitrogen such as protein, protein hydrolysate, polypeptides, amino acids, corn steep liquor, etc.; and inorganic anions and cations such as potassium, sodium, calcium, sulfate, phosphate, chloride, etc. Tract elements such as boron, copper, etc. are supplied as impurities of the other constituents of the media. Aeration is provided by forcing sterile air through or onto the surface of the fermentation medium. Agitation is provided by a mechanical impeller. An antifoaming agent, such as 1 percent octadecanol in lard oil, may be added as needed.

INOCULUM PREPARATION

Shaker flask seed inoculum is prepared by inoculating 100 ml. portions of sterile liquid medium in 500 ml. flasks with scrapings or washings of spores from an agar slant of the culture. The following medium is ordinarily used:

|  | % |
|---|---|
| Cerelose | 2 |
| Soy flour | 1 |
| Corn Steep Liquor | 0.5 |
| Calcium Carbonate | 0.3 |
| Water to | 100 |

The flasks are incubated at a temperature from 15° to 37°C., preferably 28°C. and agitated vigorously on a rotary shaker for 24 to 96 hours. These 100 ml. portions of seed inoculum are used to inoculate 12 liter batches of the same medium in 20 liter glass fermentors. The inoculum mash is aerated with sterile air while growth is continued for 24 to 72 hours. These batches of inocula in turn, are used to inoculate tank fermentors.

TANK FERMENTATION

For production in tank fermentors, the following fermentation medium is preferably used:

|  |  |
|---|---|
| Glucose | 1% |
| Molasses | 2% |
| Tryptone | 1% |
| Water to | 100% |

The pH of this medium is adjusted to pH 4 to 8.

Each tank is inoculated with 1 to 10 percent of inoculum, prepared as described above. Aeration is supplied at the rate of 0.5 to 1.0 liter of sterile air per liter of mash per minute and the fermenting mixture is agitated by an impeller driven at 200–400 rpm. The temperature is maintained at 15° to 37°C., usually at 28°C. The fermentation is normally continued for 48 to 200 hours, at which time the mash is harvested.

ISOLATION

The harvested mash is filtered and the filtrate is extracted with a solvent such as n-butanol, n-pentanol, 2-methylpropanol or ethyl acetate. The extract is evaporated to a syrupy residue which is redissolved in a solvent such as a chlorinated hydrocarbon, preferably chloroform. The chloroform concentrate is then charged on a suitable chromatographic column, preferably silica gel. The column is eluted using chloroform followed by a linear gradient of chloroform and an ester, preferably ethyl acetate. Flow rate of the column is normally about 12 ml/minute. Pooling of the column fractions is determined by visually examining residue of aliquots from each tube. After collection, the product is recrystallized from a solvent such as benzene.

TESTING PROCEDURES AND RESULTS

Method A

Measurement of analgesic activity was made by the "writhing syndrome" test and the method was carried out essentially as described by Siegmund, et al., in Proc. Soc. Biol. Med. 95: 729 (1957). The test is based upon the reduction of the number of writhes following the intraperitoneal injection of one mg/kg of body weight of phenyl p-quinone in male Swiss albino mice weighing 15-25 grams per mouse. The syndrome is characterized by intermittent contractions of the abdomen, twisting and turning of the trunk, and extension of the hind legs beginning 3 to 5 minutes after injection of the phenyl p-quinone. The test compound is administered orally to groups of two mice each, 30 minutes before injection of the phenyl p-quinone. The total number of writhes exhibited by each group of mice is recorded for a 3-minute period commensing 15 minutes after injection of the phenyl p-quinone. A compound is considered active if it reduces the total number of writhes in two test mice from a control value of approximately 30 per pair to a value of 18 or less. The results appear in Table I.

TABLE I

| Compound | Oral Dose mg/kg | No. of writhes per 3-min. per. Pair 1 | Pair 2 |
|---|---|---|---|
| d-5-hydroxy-5-phenyllevulinic acid | 100 | 15 | 10 |
| | 0 | 30 | 30 |

Method B

Measurement of analgesic activity was carried out by the "rat test-radiant heat method" using essentially the procedure described by D'Amour and Smith in *J. Pharm. Exptl. Ther.*, 72 pg. 74 (1941). In this method, rays from a radiant heat source are focused on the tip of a rat's tail which is placed in a grooved board at a specific distance (normally 6 inches) from the heat source. A voltage regulator, transformer and rheostat are used to control the heat and a stop watch is operated in the same circuit to start and stop the current. In operation, the person conducting the test places the rat's tail in the groove of the board, switches on the heat source and stop watch and waits for the response, which is a sudden typical twitch of the tail, when the animal feels pain. The switch is then reversed and the time is recorded. The ability of a test compound to increase the length of time required to produce the characteristic twitch, denotes analgesic activity as expressed by the postponment of the realization of pain. The animals used were Wistar strain rats weighing approximately 100-160 grams. The test compound was administered intraperitoneally in a starch solution at the indicated levels. The results appear in Table II.

TABLE II

| Compound | Dose Level mg/kg | Stimulus Intensity or Strength | Average Time Sec. |
|---|---|---|---|
| Control starch | — | Low | 13.2 |
| | | Intermediate | 8.2 |
| | | High | 4.1 |
| d-5-Hydroxy-5-phenyllevulinic acid | 50 | Low | 21.7* |
| | | Intermediate | 9.7 |
| | | High | 4.7 |
| d-5-Hydroxy-5-phenyllevulinic acid | 50 | Low | 20.2* |
| | | Intermediate | 10.6 |
| | | High | 5.4 |

*Increases in reaction time that are considered significant for control.

Method C

The analgesic activity was measured by a modification of the method of Randall and Selitto, described in *Arch. Int. Pharmacodyn* 111, pg. 409 (1957). This method is used to measure the pain threshold of rats whose paws are made sensitive to pressure by injection of a 20 percent aqueous suspension (0.1 ml.) of Brewer's yeast into the plantar surface of the left hind paw. When sufficient pressure is applied to the inflamed paw, a sudden struggle or vocalization is elicited and the pressure is recorded. A maximum (cut-off) pressure of 250 grams is employed. Control rats respond at a pressure of about 25 grams. The test compound was administered orally or intraperitoneally in a starch vehicle. Test recordings were made 1 hour after administration. A pre/post treatment ratio of greater than 1.36 indicates analgesic activity. The results appear in Table III.

TABLE III

| Compound | Dosage Mg/kg | Pre/Post Treatment |
|---|---|---|
| d-5-Hydroxy-5-phenyllevulinic acid | 200 orally | 1.74 |
| d-5-Hydroxy-5-phenyllevulinic acid | 200 orally | 1.67 |
| d-5-Hydroxy-5-phenyllevulinic acid | 100 intraperitoneally | 1.77 |
| Control | 200 orally or 100 intraperitoneally | 0.96 |

Thus the compound d-5-hydroxy-5-phenyllevulinic and its non-toxic pharmaceutically acceptable salts have been found to be useful as analgesics.

SPECIFIC DISCLOSURE OF THE INVENTION

EXAMPLE 1

Inoculum Preparation

Spores from an agar slant of Tubercularia strain Z1497 are used to inoculate a 500 ml. flask containing 200 ml. of the following medium:

| | % |
|---|---|
| Cerelose | 2 |
| Soy Flour | 1 |
| Corn steep liquor | 0.5 |
| Calcium carbonate | 0.3 |
| Water s to | 100 |

The flasks are placed on a rotary shaker and agitated vigorously at 28°C. for 48 hours. The resulting flask inoculum is transferred to a 5 gallon glass fermentor containing 12 liters of the above medium. The glass fermentor is aerated with sterile air while growth is carried out for 48 hours. The contents are used to seed a 300 liter tank fermentor.

EXAMPLE 2

Fermentation

A fermentation medium is prepared according to the following formulation:

| | |
|---|---|
| Glucose | 1% |
| Molasses | 2% |
| Tryptone | 1% |
| Water qs to | 100% | and adjusted to about pH 6.2. A 300 liter portion of the above medium in a 400 liter fermentor is inoculated with 12 liters of inoculum prepared as described in Example 1. The fermentation is carried out at 28°C. for 95 hours. Aeration is supplied at the rate of 0.5 liters of air per liter of mash per minute. The mash is agitated by an impeller driven at 300 rpm.

EXAMPLE 3

Isolation and Purification

The harvested mash (300 liters) is filtered and the filtrate is extracted with 175 liters of n-butanol. The extract is evaporated with water to a 5 liter aqueous concentrate. This concentrate is extracted with ethyl acetate and the resulting extract is evaporated to a syrup which is redissolved in chloroform. The 200 ml. of chloroform concentrate is charged on a silica gel column 6 × 40 cm., Davison Co., 60–200 mesh. Elution of the column is accomplished using 4 liters of chloroform followed by a linear gradient of 3 liters of chloroform and 3 liters of ethyl acetate. The flow rate of the column is approximately 12 ml/minute.

The pooling of column fractions is determined by drying small aliquots of each tube and visibly comparing the solids. Concentration of one of these pooled fractions yields crystalline material on standing. This material had been eluted from the column in tubes 16–56 (elution volume 1,000–4,000 ml. of chloroform). Recrystallization from warm benzene yields 6.3 grams of product.

Analysis calculated for $C_{11}H_{12}O_4$:
C, 63.46; H, 5.76
Found: C, 63.84; H, 5.86
Melting point: 86°–87°

$\lambda_{max}^{CH_3OH}$ 210 mu ($\epsilon$>5,000), 260 mu ($\epsilon$270), 284 mu ($\epsilon$270).

$[\alpha]_D^{25} + 155° \pm 0.29$ (C 0.692, $CH_3OH$)

This material demonstrates significant analgesic activity in the previously stated analgesic testing procedures.

We claim:

1. The compound d-5-hydroxy-5-phenyllevulinic acid and non-toxic pharmaceutically acceptable salts thereof.

* * * * *